United States Patent [19]
Borg

[11] Patent Number: 5,329,548
[45] Date of Patent: Jul. 12, 1994

[54] BASE STATION FOR A FREQUENCY HOPPING TDMA RADIO COMMUNICATION SYSTEM

[75] Inventor: Lars U. Borg, Stockholm, Sweden

[73] Assignee: Telefonaktiebolaget L. M. Ericsson, Stockholm, Sweden

[21] Appl. No.: 37,410

[22] Filed: Mar. 26, 1993

[30] Foreign Application Priority Data

Mar. 27, 1992 [SE] Sweden .............................. 9200962-0

[51] Int. Cl.[5] .......................... H04J 4/00; H04B 1/00
[52] U.S. Cl. ......................................... 375/1; 370/38; 370/50; 455/103; 455/53.1
[58] Field of Search ....................... 375/1; 370/38, 50; 455/101, 103, 53.1, 56.1

[56] References Cited

U.S. PATENT DOCUMENTS 4,479,226 10/1984 Prabhu et al. ........................... 375/1
4,545,059 10/1985 Spinks, Jr. et al. ..................... 375/1
5,048,116 9/1991 Schaeffer ................................ 455/33
5,142,534 8/1992 Simpson et al. ...................... 370/50

FOREIGN PATENT DOCUMENTS 0479741 4/1992 European Pat. Off. .
2242807 10/1991 United Kingdom .
90/16122 12/1990 World Int. Prop. O. .

Primary Examiner—Gilberto Barrón, Jr.
Attorney, Agent, or Firm—Burns, Doane, Swecker & Mathis

[57] ABSTRACT

A base station for a cellular frequency hopping TDMA radio communication system comprises at least two transmitter groups, each containing at least one transmitter, connected to individual antennas in an antenna group of a cell. Means are included for controlled frequency hopping in at least one TDMA channel such that its signal bursts are distributed on different antennas in the antenna group.

6 Claims, 2 Drawing Sheets

BASE STATION FOR A FREQUENCY HOPPING TDMA RADIO COMMUNICATION SYSTEM

TECHNICAL FIELD

The present invention relates to a base station for cellular frequency hopping TDMA radio communication systems.

BACKGROUND OF THE INVENTION

Base stations in cellular frequency hopping TDMA communication systems often comprise frequency hopping transmitters and broad band combiners, in which case the frequency hops are performed in the transmitter itself, or transmitters capable of sending on only a single frequency and filter combiners, in which case the frequency hops are performed by switching the signal to different transmitters, so called base band hops. A disadvantage of these systems is the power loss that is associated with each combiner stage, approximately 3 dB for broad band combiners and approximately 4 dB for filter combiners. Since especially broad band combiners usually accept only two input signals the accumulated loss in several combiner stages in a base station can be unacceptable if the number of transmitters exceeds approximately 4.

SUMMARY OF THE DISCLOSURE

Thus, an object of the present invention is to provide a base station for frequency hopping TDMA radio communication systems, in which the transmitter output power is better utilized and which furthermore provides transmission with space diversity.

The above object is in accordance with the present invention solved by a base station that is characterized by at least two transmitter groups, each including at least one transmitter, connected to individual antennas in an antenna group of a cell, and by means for controlled frequency hops in at least one TDMA channel such that its signal bursts are distributed on different antennas within the antenna group.

From U.S. Pat. No. 4,545,059, it is known per se to connect two antennas to a frequency hopping transmitter. However, in the known apparatus both antennas are simultaneously connected to the same output signal.

Furthermore, from European patent application No. 91 850022.4 it is previously known to order an antenna change in a base station from a mobile station in case the reception is poor. However, in this previously known apparatus a switch is not provided until after the transmitter section, which means that no gain in power is possible.

BRIEF DESCRIPTION OF THE DRAWINGS

The invention, together with further objects and advantages thereof, may best be understood by making reference to the following description taken together with the accompanying drawings, in which.

DETAILED DESCRIPTION OF THE PREFERRED EMBODIMENTS

Figure 1:
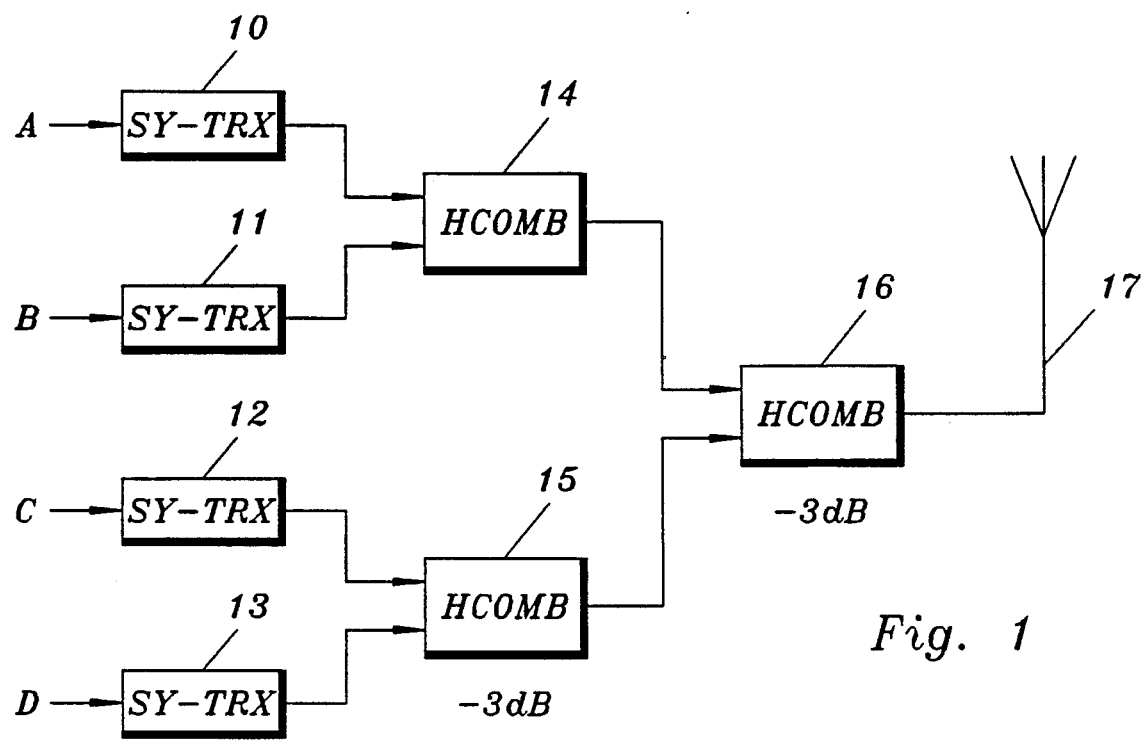
FIG. 1 diagrammatically shows a previously known structure for a base station in a TDMA mobile radio communication system.

Throughout the Figures of the drawing the same reference designations have been used for corresponding elements.

FIG. 1 diagrammatically shows a previously known structure for a base station in a TDMA mobile radio communication system. In this structure four signals A-D are directed to corresponding transmitters SY-TRX 10-13. These transmitters can perform the frequency hops themselves. Such a transmitter is often called a "synthesizer hopping transmitter". The output signals from each pair of transmitters 10, 11 and 12, 13, respectively, are directed to corresponding broad band combiners HCOMB 13 and 15. Such combiners are often referred to as hybrid combiners. The output signals from these hybrid combiners 14, 15 are directed to a further hybrid combiner 16, the output signal of which is directed to an antenna 17. In each combiner stage, about 3 dB of the output power is lost (half of the power). If more transmitters are desirable, e.g., if the call capacity is to be increased, the number of combiner stages has to be increased, since hybrid combiners only can have two inputs. Thus, this structure is most suitable for base stations with a low call capacity.

Figure 2:
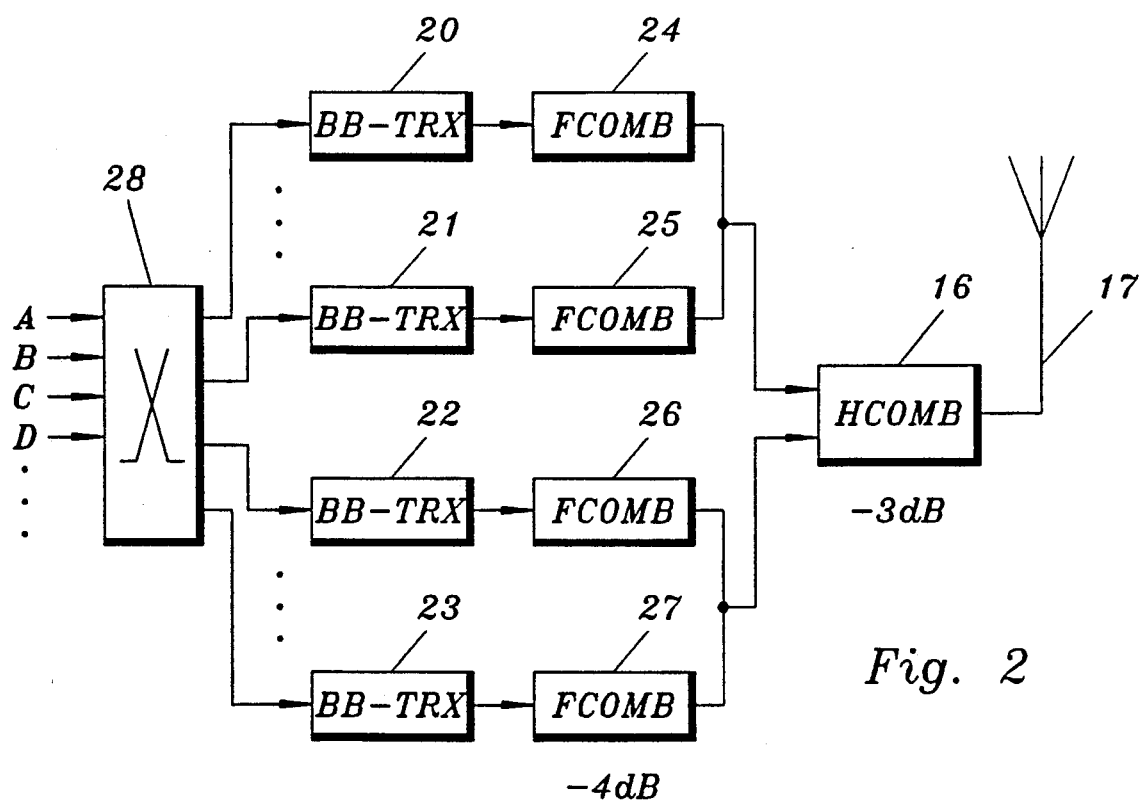
FIG. 2 diagrammatically shows another previously known structure for a base station in a TDMA mobile radio communication system.

FIG. 2 diagrammatically shows another previously known structure for a base station in a TDMA mobile radio communication system. In this structure signals A-D are directed to a number of transmitters BB-TRX 20-23 over a switch 28. These transmitters are capable of transmitting on only a single frequency. Such transmitters are often referred to as "base band hopping transmitters". The reason for this is that the frequency hops in this case are not performed in the transmitter but in switch 28, which switches different signal bursts or time slots of signals A-D to different transmitters 20-23. Signal A can for instance during one time slot be connected to transmitter 20, during the next time slot to transmitter 22, then to transmitter 21, etc. The output signals from transmitters 20, 21 are directed to associated filter combiners 24, 25, while the output signals of transmitters 22, 23 are directed to associated filter combiners 26, 27. The output signals from filter combiners 24, 25 are combined and directed to one input of a hybrid combiner 16. In the same way the output signals from combiners 26, 27 are directed to the other input of hybrid combiner 16. The output of hybrid combiner 16 is connected to an antenna 17.

In FIG. 2 only four input signals A-D and four transmitters 20-23 have been shown. However, the dots indicate that this structure usually contains more input signals and more transmitters. A transmitter group, e.g., the group containing transmitters 20, 21, can comprise up to 16 transmitters.

Also in this structure there is a power loss in two stages, namely approximately 4 dB in the filter combiner stage and approximately 3 dB in the hybrid combiner stage.

Figure 3:
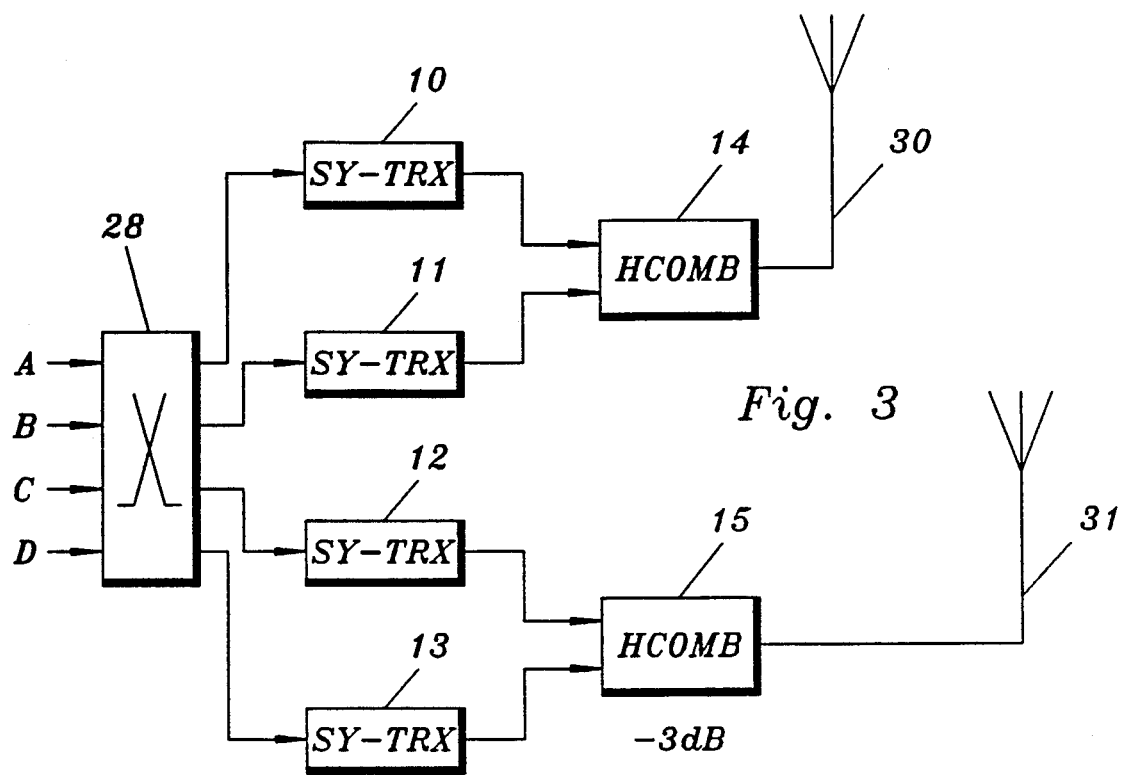
FIG. 3 diagrammatically shows an embodiment of the present invention based on the structure in FIG. 1.

FIG. 3 diagrammatically shows an embodiment of the present invention based on the structure of FIG. 1. In this embodiment, the hybrid combiner 16 closest to the antenna 17 in FIG. 1 has been eliminated. Instead the output signal from hybrid combiner 14 is directly fed to the antenna 30, while the output signal from hybrid combiner 15 is directly fed to an antenna 31. This division is possible due to the fact that the TDMA transmission schedule for a cell guarantees that two transmitters do not simultaneously transmit on the same frequency.

If the base station contains more transmitters and therefore also more combiner stages, the method could be repeated, so that the combiner closest to the antenna is eliminated and replaced by two antennas. For each combiner stage that is eliminated, there is a doubling of the number of antennas. For each combiner stage eliminated one also obtains a power gain of approximately 3 dB.

The obtained power gain can be used either for an increase of the output power or for an increase of the number of transmitters without changing the output power. Furthermore, if antennas 30, 31 are located at a sufficiently large distance from each other, i.e., a number of wavelengths, e.g., a distance of the order of 3 m or more for carrier frequencies of approximately 900 MHz, it is also possible to obtain space or antenna diversity. This is obtained by connecting a switch 28 before the transmitters 10-13 and alternately switching the signals between transmitter groups 10, 11 and 12, 13, respectively. As a result the signal bursts of a TDMA channel will not only change frequency but also transmitter antenna.

If more than two antennas are used the signal bursts can be cyclically switched between the antennas in the antenna group.

In another embodiment, the signal bursts can randomly be switched between the antennas in the antenna group.

In a further embodiment the switching can be performed on demand, e.g., when a mobile station has detected that the signal from an antenna is unacceptable and orders change of antenna within the antenna group. The signalling can be performed in the same way as is described in European patent application No. 91 850022.4.

One reason that the described antenna diversity is so efficient is the bit interleaving that usually is used in digital radio communication systems. In the US standard IS-54 for digital mobile telephony, the bits in a 20 ms speech frame are bit interleaved over two consecutive time slots in a traffic channel. In the European GSM system, the bits in a speech frame are interleaved over eight time slots. However, in both cases, half the number of signal bursts will be transmitted on one antenna and the remaining signal bursts will be transmitted on the other antenna. Hereby, it is avoided that all the bits in a speech frame are received by the mobile station on a rapidly fading channel. Due to the redundancy of the coding, the speech frames can be reconstructed from the correctly received bits.

Figure 4:
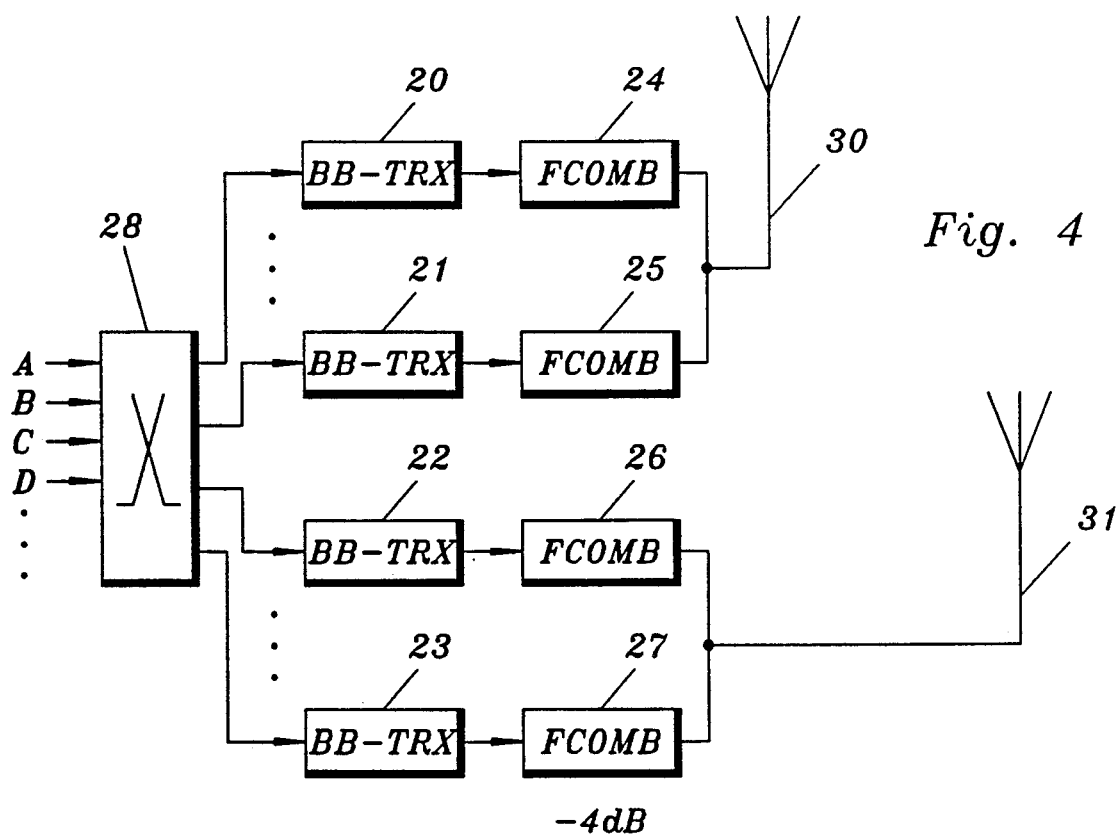
FIG. 4 diagrammatically shows another embodiment of the present invention based on the structure of FIG. 2.

FIG. 4 diagrammatically shows another embodiment of the present invention based on the structure of FIG. 2. Also in this embodiment the hybrid combiner 16 has been eliminated and the combined signal from filter combiners 24, 25 are fed to an antenna 30 and the signals from filter combiners 26, 27 to an antenna 31.

Thus, a power gain of 3 dB has been obtained also in the embodiment of FIG. 4. This power gain can be used for an increase of the output power from the base station. As an alternative, the number of transmitter groups can be increased with a further hybrid combiner stage without increasing the power loss as compared to the case in which only one antenna is used.

The embodiment of FIG. 4 has the further advantage that the antenna diversity is easily obtained since switch 28 is already present in the structure.

Another advantage of the space diversity obtained by the invention is the increased flexibility in the planning of the TDMA-transmitting schedule. Since diversity, namely space diversity, is obtained already by the antenna change between two time slots, it is possible to refrain from frequency hops between these time slots or to reduce the number of hopping frequencies. A reduction of the number of hopping frequencies can be of special interest in connection with base stations that are equipped with transmitters that are sending only on a single frequency, since in this case the number of hopping frequencies is limited to the number of transmitters.

It will be understood by those skilled in the art that various modifications and changes may be made to the present invention without departure from the spirit and scope thereof, which is defined by the appended claims.

I claim:

1. A base station for cellular frequency hopping TDMA radio communication systems, comprising:
    at least two transmitter groups, each including at least one transmitter, each transmitter group being permanently connected to one respective antenna in an antenna group of a cell, and
    means for controlled frequency hops in at least one TDMA channel, such that the signal bursts thereof are distributed on different transmitter groups and therefor on different antenna within the antenna group.

2. The base station of claim 1, wherein all antennas in the antenna group are always sending on the different frequencies.

3. The base station of claim 2, wherein the distance between antennas in the antenna group exceeds more than a few carrier wavelengths.

4. The base station of claim 3, further comprising means for cyclic distribution of the signal bursts on antennas within the antenna group.

5. The base station of claim 3, further comprising means for randomly distributing the signal bursts on the antennas within the antenna group.

6. The base station of claim 3, further comprising means for demand controlled distribution of the signal bursts on the antennas within the antenna group.

* * * * *